United States Patent [19]

Temple et al.

[11] 4,437,453

[45] Mar. 20, 1984

[54] PLASTIC PIPE HEATER

[76] Inventors: Eugene A. Temple, 1492 Glencoe Ave., Highland Park, Ill. 60035; Norman F. Pestlin, 6870 W. 176th Pl., Tinley Park, Ill. 60477

[21] Appl. No.: 453,485

[22] Filed: Dec. 27, 1982

[51] Int. Cl.³ .............................................. F23C 5/00
[52] U.S. Cl. ............................ 126/271.2 R; 425/392; 432/225
[58] Field of Search .................. 126/271.2 R, 259 M, 126/259 R, 19.5, 226, 229, 231, 401, 410; 123/142.5 R; 432/225, 226, 62, 63; 165/177; 72/367, 369, 38; 60/320; 425/317, 392; 121/196, 204, 227; 431/345, 127, 356; 239/544, 545

[56] References Cited

U.S. PATENT DOCUMENTS

| | | | |
|---|---|---|---|
| 748,493 | 12/1903 | Fox | 126/19.5 |
| 1,124,723 | 1/1915 | Garstang | 126/271.2 R |
| 1,341,514 | 5/1920 | Moss | 126/271.2 R |
| 1,476,184 | 12/1923 | Schrader | 239/545 X |
| 1,859,961 | 5/1932 | Dodd et al. | 239/544 |
| 2,920,691 | 1/1960 | Henwood et al. | 239/545 |
| 3,307,528 | 3/1967 | Cook | 126/19.5 |
| 3,404,445 | 10/1968 | Crouse | 181/227 X |
| 3,466,020 | 9/1969 | Blinne | 432/225 X |
| 3,482,648 | 12/1969 | Reeve | 181/227 |
| 4,097,573 | 6/1978 | Parmann | 264/339 X |

Primary Examiner—Samuel Scott
Assistant Examiner—Randall L. Green
Attorney, Agent, or Firm—Michael, Best & Friedrich

[57] ABSTRACT

A device for heating plastic pipe comprising a hollow annular housing with an inner surface including a plurality of dispersed perforations, and an inlet conduit attached to the housing. The inlet conduit is adapted to be connected to a source of heated air so the air can circulate through the device. In one embodiment, the annular housing is elongated and the perforations are uniformly dispersed around the inner surface. The inlet conduit is attached to the housing's midpoint and the inlet conduit and housing are made from sheet metal. The inlet conduit of the device is of such a diameter that the device can be slideably received on an automobile's exhaust pipe so the heated exhaust can circulate through the device in order to heat the plastic pipe.

7 Claims, 3 Drawing Figures

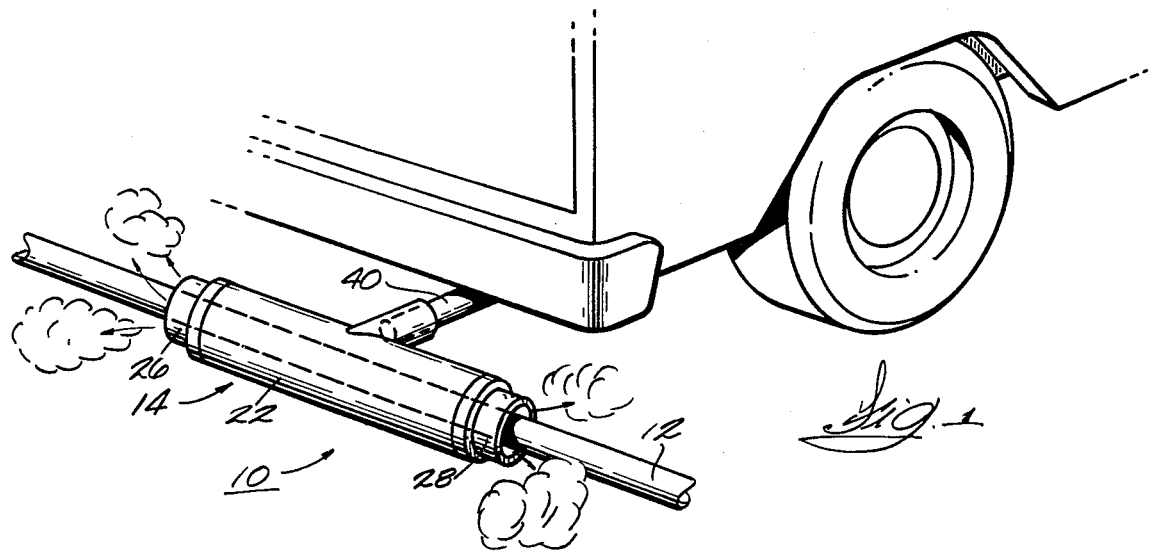
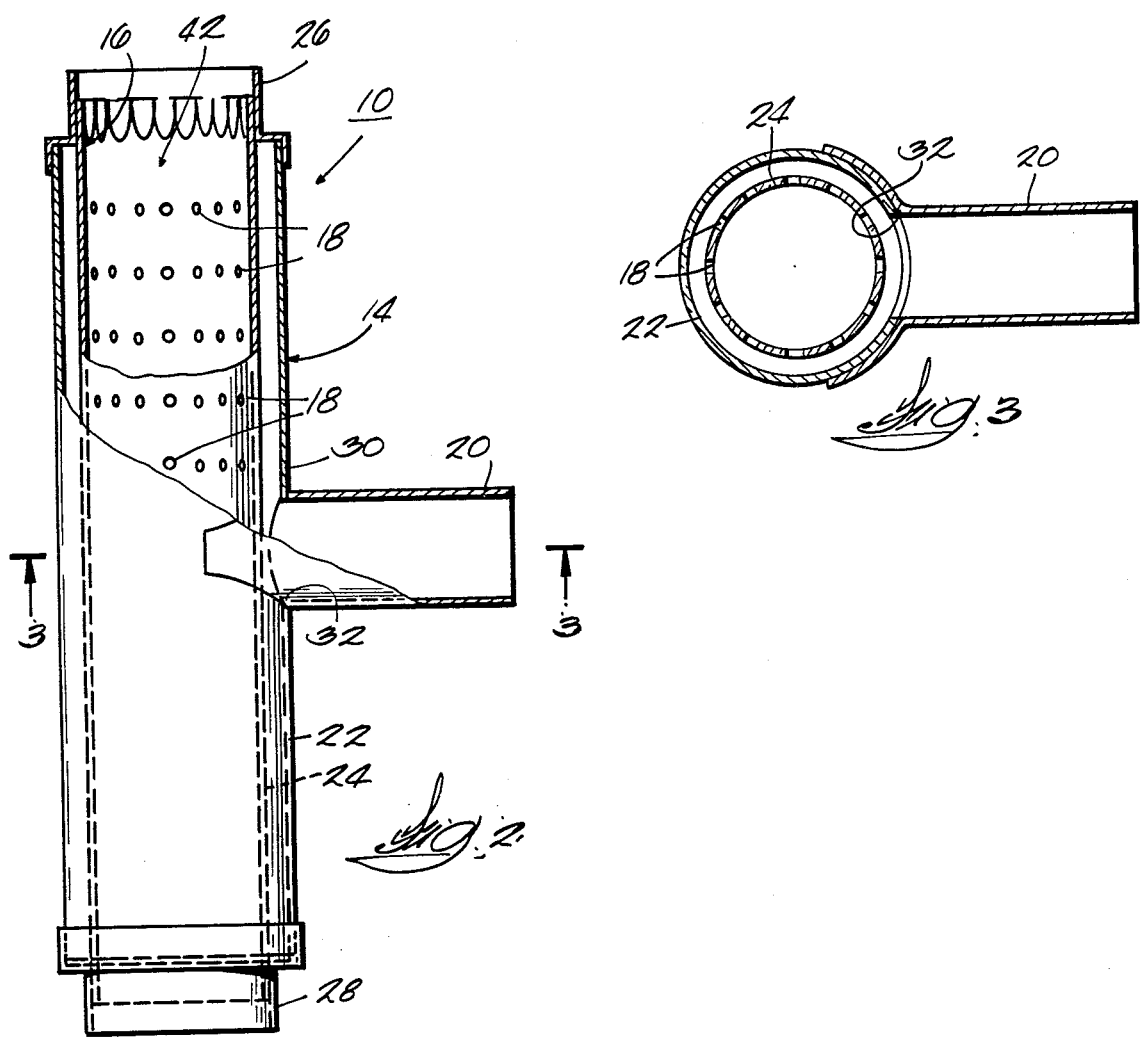

PLASTIC PIPE HEATER

BACKGROUND AND SUMMARY OF THE INVENTION

This invention relates to devices for heating plastic pipe and, more particularly, to portable devices for heating plastic pipe so the pipe can be bent to assume a desired angle.

This invention provides a device for heating plastic pipe comprising a hollow annular housing with an inner surface including a plurality of dispersed perforations, and an inlet conduit attached to the housing. The inlet conduit is adapted to be connected to a source of heated air so the air can circulate through the device.

In one embodiment, the annular housing is elongated and the perforations are uniformly dispersed around the inner surface. The inlet conduit is attached to the housing's midpoint and the inlet conduit and housing are made from sheet metal. The inlet conduit of the device is of such a diameter that the device can be slideably received on an automobile's exhaust pipe so the heated exhaust can circulate through the device in order to heat the plastic pipe.

Electrical contractors currently use expensive devices, such as the apparatus disclosed in Jelesko U.S. Pat. No. 3,957,032, for heating plastic pipe so the pipe can be bent when necessary to include a desired angle. The bent plastic pipe is used to guide and hold electrical wiring. This invention provides an inexpensive means for heating plastic pipe which is both portable and lightweight and which does not require an independent heating system. The device can in fact utilize the hot exhaust off an engine or any other source of heated air in an automobile or truck.

BRIEF DESCRIPTION OF THE DRAWINGS

FIG. 1 is a perspective view of a device for heating plastic pipe. The device is slideably received on an automobile exhaust.

FIG. 2 is a partial cross-sectional view of the device shown in FIG. 1.

FIG. 3 is a cross-sectional view of the device taken along lines 3—3 in FIG. 2.

DESCRIPTION OF THE PREFERRED EMBODIMENT

As illustrated in the drawings, this invention provides a device 10 for heating plastic pipe 12 comprising an elongated hollow annular housing 14 with an inner surface 16 including a plurality of uniformly dispersed perforations 18. An inlet conduit 20 is attached to the housing 14 at its midpoint.

More particularly, the annular housing 14 is made from sheet metal and includes an outer cylinder 22 about 6¼" in diameter and an inner coaxle cylinder 24 about 5" in diameter. The inner cylinder 24 is held in a spaced relationship relative to the outer cylinder 22 by end caps 26 and 28, and the inner cylinder 24 extends about 2" from both ends of the 21¼" outer cylinder 22.

The perforations 18 in the inner cylinder 24 are punched or cut so as to form holes about a quarter of an inch in diameter and about one inch apart.

Near the middle of the side 30 of the outer cylinder 22 is a hole 32 about 3" in diameter to receive an inlet conduit 20 of like size. The inlet conduit 20 extends radially outwardly from the side 30 of the outer cylinder 22.

In operation, the device 10 is connected to a source of heated air, such as the exhaust 40 of an automobile, where the heated air then enters the annular housing 14, encircles the inner cylinder 24 and enters the interior 42 of the inner cylinder 24 through the perforations 18. The hot air then heats the plastic pipe and exits the device 10 through the openings at either end of the annular housing 14. The heated pipe 12 is then removed from the housing 14, bent by hand to any desired angle and allowed to cool.

It is to be understood that this invention is not confined to the particular construction and arrangement of parts herein illustrated and described, but embraces all such modified forms thereof as come within the scope of the following claims.

We claim:

1. A device for heating plastic pipe comprising
   an outer tubular member;
   an inner tubular member mounted inside and spaced from said outer tubular member, said inner tubular member having a plurality of perforations therein and forming an opening which extends completely through the device for inserting therethrough the plastic pipe to be heated;
   end cap means to connect the ends of said inner and outer tubular members to thereby provide a closed annular chamber between said inner and outer tubular members; and
   inlet conduit means adapted for connection to a source of heated air, said inlet conduit means communicating with said closed annular chamber between said inner and outer tubular members.

2. A device in accordance with claim 1 wherein said inlet conduit means is attached to said outer member at its midpoint.

3. A device in accordance with claim 1 wherein said inlet conduit means, said outer member, said inner member and said end cap means are made from sheet metal.

4. A device in accordance with claim 1 wherein said inlet conduit means is slideable on an automobile's exhaust pipe.

5. A device in accordance with claim 1 wherein the ratio of the outer diameter of said outer member to the inner diameter of said inner member is about 1.25.

6. A device in accordance with claim 1 wherein said outer member is elongated and wherein said perforations are uniformly dispersed around said inner member.

7. A device for heating plastic pipe in accordance with claim 1 wherein said outer tubular member and said inner tubular member are annular.

* * * * *